(12) United States Patent
Hergart et al.

(10) Patent No.: US 7,377,254 B2
(45) Date of Patent: May 27, 2008

(54) EXTENDING OPERATING RANGE OF A HOMOGENEOUS CHARGE COMPRESSION IGNITION ENGINE VIA CYLINDER DEACTIVATION

(75) Inventors: Carl-Anders Hergart, Peoria, IL (US); William L. Hardy, Peoria, IL (US); Kevin P. Duffy, Metamora, IL (US); Michael P. Liechty, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/498,001

(22) Filed: Aug. 2, 2006

(65) Prior Publication Data

US 2008/0029057 A1   Feb. 7, 2008

(51) Int. Cl.
F02D 17/02 (2006.01)

(52) U.S. Cl. ............... 123/198 F; 123/295; 123/1 A

(58) Field of Classification Search ............ 123/198 F, 123/481, 295, 1 A; 208/15
See application file for complete search history.

(56) References Cited

U.S. PATENT DOCUMENTS

| | | | | |
|---|---|---|---|---|
| 6,662,785 | B1 * | 12/2003 | Sloane et al. | 123/481 |
| 7,089,103 | B2 * | 8/2006 | Katakura et al. | 701/54 |
| 7,131,402 | B2 * | 11/2006 | Sobotowski et al. | 123/1 A |
| 2003/0052041 | A1 | 3/2003 | Erwin et al. | |
| 2005/0268883 | A1 | 12/2005 | Sobotowski et al. | |

* cited by examiner

Primary Examiner—Stephen K. Cronin
Assistant Examiner—Hyder Ali
(74) Attorney, Agent, or Firm—Liell & McNeil

(57) ABSTRACT

An HCCI engine has the ability to operate over a large load range by utilizing a lower cetane distillate diesel fuel to increase ignition delay. This permits more stable operation at high loads by avoidance of premature combustion before top dead center. During low load conditions, a portion of the engines cylinders are deactivated so that the remaining cylinders can operate at a pseudo higher load while the overall engine exhibits behavior typical of a relatively low load.

10 Claims, 2 Drawing Sheets

EXTENDING OPERATING RANGE OF A HOMOGENEOUS CHARGE COMPRESSION IGNITION ENGINE VIA CYLINDER DEACTIVATION

GOVERNMENT RIGHTS

This invention was made with Government support under DOE Contract No. DE-FC26-05NT4 2412 awarded by the U.S. Department of Energy. The Government has certain rights to this invention.

TECHNICAL FIELD

The present disclosure relates generally to homogeneous charge compression ignition engines, and more particularly to extending an operating load range of the engine via cylinder deactivation at low load conditions.

BACKGROUND

Engineers and other scientists are constantly seeking new strategies to reduce undesirable emissions from internal combustion engines. Among these undesirable emissions are particulate matter, NOx and unburned hydrocarbons. One strategy that has proven promising for drastically reducing these undesirable emissions, especially NOx, is known as homogeneous charge compression ignition (HCCI). This strategy typically involves mixing distillate diesel fuel with air in an engine cylinder before autoignition conditions arise, with the aim of causing the mixture to combust at about top dead center. Due in part to combustion occurring at relatively lower temperatures without a flame front or locally rich concentrations of fuel, this strategy can produce extremely low emissions. However, an HCCI strategy creates new problems that must be overcome if the engine is to have the ability to compete performance wise with typical diesel engines.

One problem that has been particularly difficult in overcoming relates to the ability to operate an HCCI engine at relatively high loads. Due in part to the relatively high reactivity of commercially available distillate diesel fuel having a cetane number on the order 45 to 55 and its associated relatively short ignition delay, and the inherent limits associated with controlling ignition timing, premature ignition at high loads before top dead center can sometimes occur. When this happens, extremely high pressure rise rates can occur in the engine cylinder. These extreme pressure rise rates can often exceed the structural integrity limits of the engine, possibly to the extent of destroying head gaskets and even breaking the head free of the engine block in extreme circumstances.

Thus, limitations for achieving HCCI at high loads can be attributed in part to premature ignition of the charge prior to top dead center, such that combustion is accompanied by compression. As stated earlier, this leads to substantial pressure rise rates and sub-optimal combustion phasing from a thermo dynamic standpoint. Various strategies, such as cooled exhaust gas recirculation, reduced compression ratio, and injection timing can be effective in suppressing ignition, and hence, prevent excessive rise rates at higher loads. However, these strategies each compromise thermal efficiency. Furthermore, low compression ratios can make cold start of an engine a serious challenge. The use of heavy amounts of exhaust gas recirculation (EGR) also poses a significant challenge to current air system technologies.

The present disclosure is directed to overcoming one or more of the problems set forth above.

SUMMARY OF THE INVENTION

In one aspect, a method of operating an engine includes supplying distillate diesel fuel having a cetane number to the engine. When operating at a high load mode, a mixture of fuel and air is compressed through an autoignition condition in each of the plurality of cylinders of the engine. When operating in a low load mode, a mixture of fuel and air is compressed in some but not all of the plurality of cylinders of the engine through an autoignition condition. The number of cylinders operational at low load conditions is responsive to the cetane number of the fuel.

In another aspect, an engine includes an engine housing with the plurality of cylinders and a fuel injector positioned for direct injection into each of the cylinders. A fuel tank of distillate diesel fuel is fluidly connected to the engine. An electronic controller is configured to actuate all of the fuel injectors in a high load mode, and actuate at least one, but less than all, of the fuel injectors in a low load mode. A majority of fuel for each engine cycle for each actuated fuel injector is injected before autoignition conditions arise in the respective cylinder.

DETAILED DESCRIPTION

Figure 1:
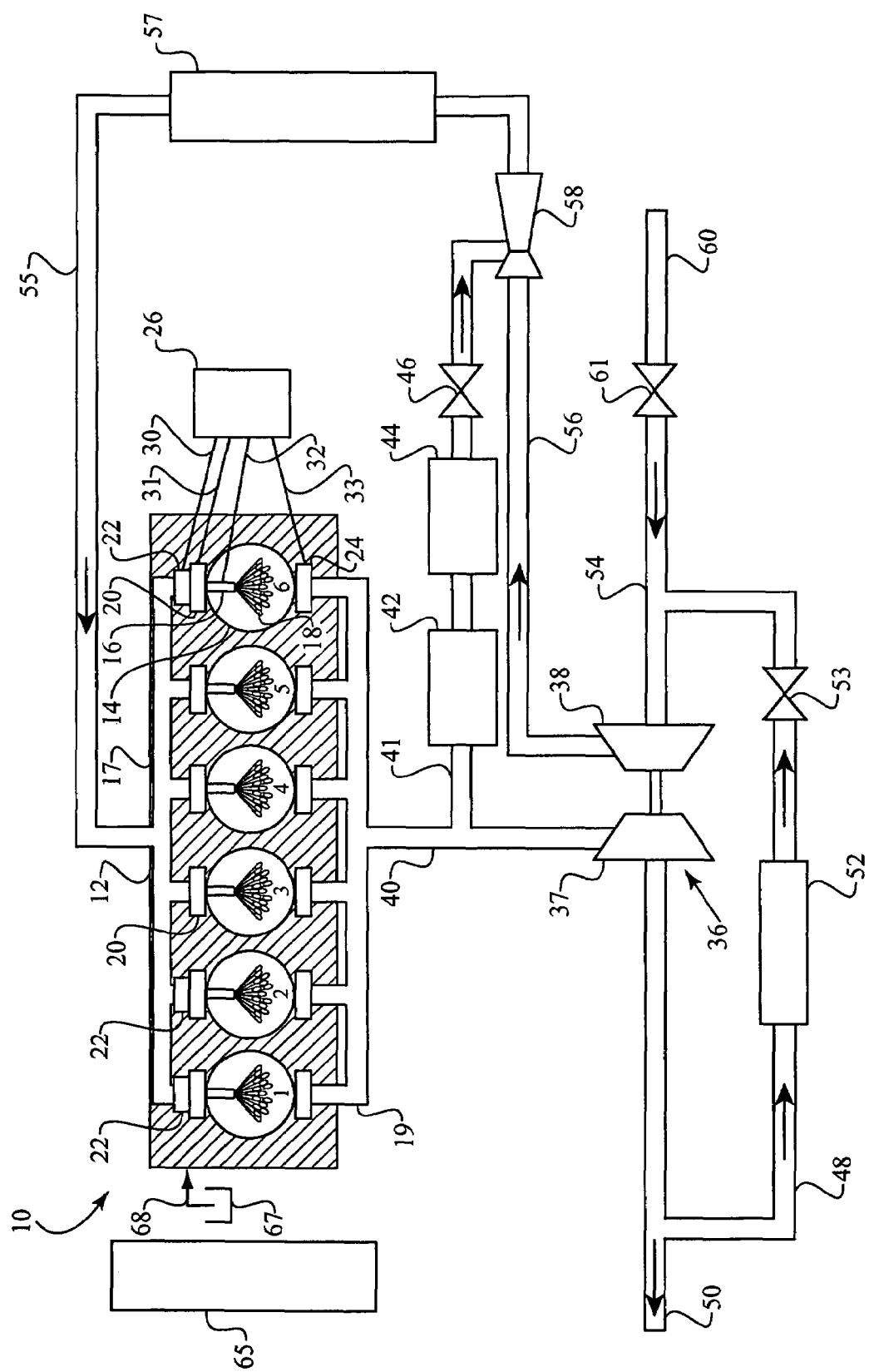
FIG. 1 is a schematic illustration of an engine according to the present disclosure.

Referring to FIG. 1, an HCCI engine 10 includes an engine housing 12 that includes a plurality of cylinders 14 disposed therein. In the illustrated embodiment, engine 10 includes six in-line cylinders 14. Nevertheless, those skilled in the art will appreciate that other configurations, including V or radial configurations, and engines containing more or less than six cylinders are clearly contemplated within the scope of this disclosure. As in a typical compression ignition engine, a fuel injector 16 is positioned for direct injection into each of the cylinders 14. Each fuel injector tip may be configured to inject fuel in a shower head spray pattern 18 that includes multiple spray plumes from relatively small diameter holes that are oriented at a plurality of different angles with respect to the fuel injector center line. Thus, a shower head spray pattern 18 differs from a conventional diesel spray pattern, which typically involves a plurality of relatively larger sized nozzle holes oriented at one angle with regard to the fuel injector center line. Although a shower head type nozzle tip may be preferred in the context of the present disclosure, other nozzle tips having other spray patterns, including conventional spray patterns also fall within the scope of the present disclosure. The fuel injectors 16, and hence engine 10, is fluidly connected to a fuel tank 67 containing distillate fuel, such as diesel, characterized by a cetane number via a fuel supply line 68. The fuel may be pressurized for injection in any suitable manner, such as via a high pressure pump and a common rail that supplies the individual fuel injectors 16, via cam actuation in each individual fuel injector, via individual unit injector pumps, or possibly via a hydraulically driven plunger, or any other manner known in the art.

Engine 10 may be equipped with some suitable means for controlling ignition timing in each of the individual cylinders. In the illustrated embodiment, each cylinder is equipped with a variable intake valve actuator that assists in varying the compression ratio, and hence ignition timing in each of the individual cylinders. Variable intake valve actuator 20 could be a known actuator that works in conjunction with a cam actuated intake valve to hold the same open beyond a cam dictated closing timing, or the variable intake valve can be a purely electronically controlled device that allows the intake valve to be opened and closed at any desirable timing during each engine cycle. Engine 10 may, but need not necessarily be, also equipped with a known device for varying compression ratio of all of the cylinders simultaneously, such as a device that raises or lowers the engine crank shaft in the engine housing. As in a typical engine, engine 10 includes an intake manifold 17 that is separated from the individual cylinders by the variable intake valves 20. Also as typical, engine 10 includes individual exhaust valve actuators 24 associated with each of the cylinders 14 that allow the exhaust contents of the cylinders to be emptied into an exhaust manifold 19 in a conventional manner. Exhaust valve actuators may be a simple fixed timing cam actuated system, may include a variable timing actuator in conjunction with a cam actuated system, or may include completely electronically controlled exhaust valve actuators too that allow the same to be opened at any timing across the engine's cycle. In addition, the present disclosure contemplates the exhaust valve actuators 24 being part of engine brakes, if appropriate. At least one, but not all, of the cylinders 14 are equipped with an intake valve disabling device 22. In the illustrated embodiment, three of the six cylinders are equipped with intake valve disabling devices that allow the engine to be operated using the remaining cylinders 14, such as during low load conditions. The intake valve disabling devices 22, variable intake valve actuators 20, fuel injectors 16 and exhaust valve actuators may be electronically controlled in a conventional manner via communication lines 30-33, respectively, by an electronic controller 26.

Although not necessary, engine 10 may be equipped with one or more turbochargers 36 to allow for boosted intake pressure. In addition, although not necessary, engine 10 may be equipped with a means for providing substantial amounts of exhaust gas recirculation. For instance, the illustrated embodiment shows an engine 10 equipped for providing high and low pressure exhaust gas recirculation via exhaust upstream and downstream from turbocharger 36, respectively. In particular, an exhaust passage 40 is connected to exhaust manifold 19. A high pressure EGR line 41 connects to exhaust passage 40 and passes the high pressure exhaust through a particle trap 42, a cooler 44, a control valve 46 and a venturi 58. The remaining exhaust gases in exhaust passage 40 pass through turbine 37 of turbocharger 36. After exiting turbine 37, a portion of the now low pressure exhaust gases exit via tailpipe 50, but another portion may be reticulated via a low pressure exhaust gas return passage 48 that passes through a cooler 52 and a control valve 53. Fresh air is drawn in at intake 60, passes through control valve 61 and joins with the low pressure exhaust gas return passage 48 at a tee connection 54. Thereafter, the mixture of fresh air and low pressure exhaust gas is compressed in compressor 38 and passed to venturi 58 via return line 56. The combined high pressure exhaust gas, low pressure exhaust gas, and fresh air pass through an air-to-air aftercooler 57 on the way to intake manifold 17 via intake passage 55. Those skilled in the art will appreciate that other exhaust gas recirculation systems known in the art fall within the present disclosure, for instance, alternative designs may include staged turbochargers, turbochargers in parallel that are devoted to the respective cylinder groupings that do and do not include an intake valve deactivation device 22, or any combination of know exhaust systems. Nevertheless, those skilled in the art will appreciate that the engine 10 preferably has some exhaust gas recirculation system in order to have a means of providing inert gas to the air fuel mixture to alter ignition timing and suppress peak combustion pressures in a manner known in the art. Engine 10 may also be equipped with a conventional radiator 65.

Figure 2:
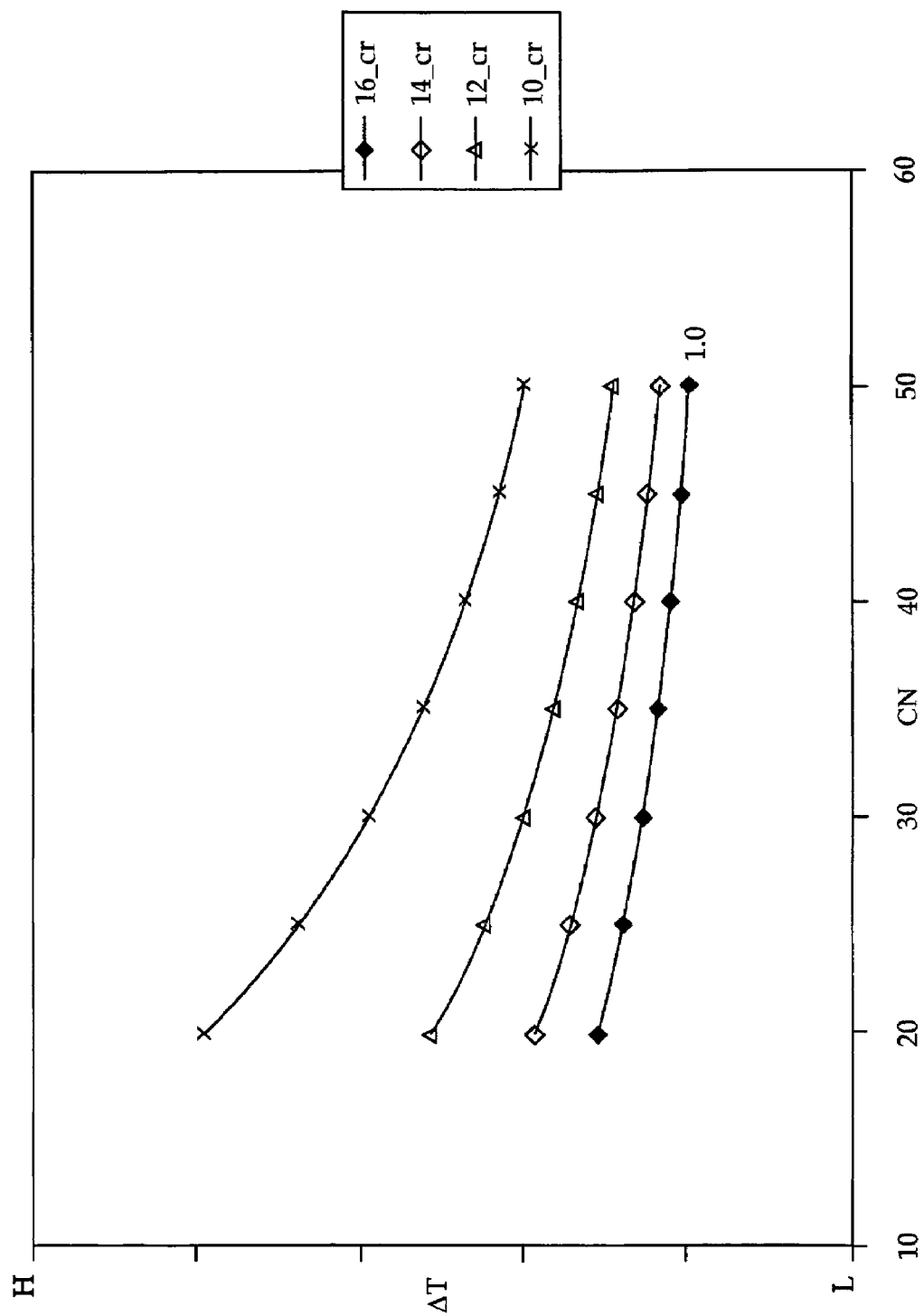
FIG. 2 is a graph of ignition delay verses cetane number of the fuel for a variety of compression ratios.

Referring now to FIG. 2, a normalized graph of high and low ignition delay ΔT versus cetane number (CN) are shown for a variety of compression ratios, including 10, 12, 14 and 16. Those skilled in the art will appreciate that cetane number in distillate diesel fuel refers generally to the reactivity of the fuel. The higher the reactivity, the shorter the ignition delay. Because of the relatively high reactivity of commercially available distillate diesel fuel, which generally falls in the range of from about 45 to 55, relatively short ignition delays can be expected. While a higher reactivity may be desirable to make an HCCI engine to operate at relatively low loads, those skilled in the art will appreciate that ignition timing control at relatively high loads with high reactive distillate diesel fuel can be problematic. The present disclosure seeks to address this quandary without compromising thermal efficiency by utilizing a relatively lower cetane number distillate fuel that is useful in avoiding premature combustion at relatively high loads, and disables some of the engine cylinders at relatively low loads. By disabling some of the engine cylinders at low load, the operational cylinders operate at a pseudo higher load that allows the fuel to be controllably combusted, but the overall engine exhibits behavior associated with a low load condition because less than all of the cylinders 14 are producing power.

INDUSTRIAL APPLICABILITY

Engine 10 is operated in a typical HCCI fashion in that the fuel, air and EGR, if any, are allowed to mix before cylinder conditions reach an autoignition condition. In other words, fuel is generally injected directly into the individual cylinders 14 into a mixture of air and exhaust gas before autoignition conditions have arisen in the cylinder. This fuel may be injected at any time during the intake or compression stroke before autoignition conditions arise. However, better emissions performance has been observed by injecting the fuel not long before autoignition conditions arise so that the fuel/air/exhaust mixture forms a less homogeneous mixture than what could be possible with more thorough mixing. For instance, the fuel might be injected in the range of from about 40 to about 90 degrees before top dead center in the individual cylinders 15. Thus, during typical operation, the charge mixture of fuel/air and exhaust is compressed through an autoignition condition. In most instances all of the fuel for each cylinder in the given cycle will be injected before autoignition conditions arise in that respective cylinder. However, the present disclosure also contemplates a mixed mode operation in which only a majority of the fuel is injected before autoignition conditions arise but some additional amount of fuel is injected in a more conventional manner to achieve some desired result. For instance, additional unburned fuel could be supplied to regenerate the particle traps by injecting fuel during the expansion stroke. In addition, some further reductions in particulate matter generated during homogeneous charge compression ignition combustion event can be "cleaned up" by injecting and burning a small amount of fuel early in the expansion stroke while autoignition conditions still exist. Thus, those skilled in the art will appreciate that a variety of injection strategies and timings could be utilized without departing from the present disclosure. Nevertheless, in all versions of the present disclosure, a majority of the fuel for a given engine cycle is injected before autoignition conditions arise, and preferably that fuel is injected relatively late in the compression stroke, but before autoignition conditions have arisen.

When operating in a high load condition, all of the cylinders will be provided with fuel during each engine cycle. However, during low load conditions, the fuel injectors associated with the cylinders having an intake valve disabling device 22 are not actuated. The fuel that would have been injected into those cylinders is reallocated to the fuel injectors associated with the remaining cylinders that are operated during the low load condition. By doing so, the additional fuel makes it easier for combustion to occur in those cylinders such that those individual operating cylinders operate in a pseudo higher load condition, but the overall engine 10 exhibits behavior associated with a lower load condition. The higher amounts of fuel injected in the operational cylinders at lower load conditions enables the fuel to be compression ignited, whereas lower amounts of fuel if all of the cylinders were operated in the low load condition might produce unstable results where some or all of the cylinders are unable to compression ignite with smaller charges.

Those skilled in the art will appreciate that intake geometry and other factors can cause individual cylinders to behave differently. Thus, although not necessary, the present disclosure includes a strategy for choosing which of the cylinders 14 will be equipped with an intake deactivation device 22. This may be accomplished by determining a variance in the indicated mean effective pressure for each of the individual cylinders in a manner known in the art. The cylinders having a lower variance may be chosen to be operational at the lower load, and those associated with a higher variance may be chosen to include an intake valve disabling device 22. Thus, the number of cylinders that are operational at low load will have an average variance that is less than the average variance of the remaining cylinders which do include an intake valve deactivation device 22 and are not operated during low load conditions. While employing this strategy is not necessary, those skilled in the art will appreciate that it can assist in making the task of controlling the engine more manageable within a smaller band width of available control mechanism(s), especially during the low load operation.

Those skilled in the art will appreciate that the control valves 46, 53 and 61 may be controlled via an electronic controller in a conventional manner in order to vary the ratios of fresh air to exhaust gas across engine 10's operating range. In the illustrated system, extremely high levels of exhaust gas recirculation, if desired, may be achieved by throttling control valve 61 to limit fresh air intake. Otherwise, valve 61 will generally remain at, or nearly at, a fully opened position and the relative ratios of exhaust gas to fresh air may be controlled via control valves 46 and 53, as desired.

In the illustrated embodiment, fuel tank 67 contains distillate fuel characterized by a cetane number in the range of 20 to 35 to render it less reactive than commercially available typical distillate diesel fuel having a cetane number on the order of 45 to 55. For instance, fuel tank 67 may contain distillate fuel having a cetane number of 25, and with this cetane number three of the six cylinders, or half, are chosen to include an intake valve deactivation device 22. On the other hand, if an even lower cetane number fuel were utilized, such as a cetane number of 20, engine 10 might include four of six cylinders having an intake valve deactivation device 22. On the other hand, if the fuel had a cetane number on the order of about 35, maybe only two of the cylinders would include an intake valve deactivation device 22. Thus, those skilled in the art will appreciate that the number of cylinders made operational during low load conditions is responsive to the cetane number of the fuel.

It should be understood that the above description is intended for illustrative purposes only, and is not intended to limit the scope of the present invention in any way. Thus, those skilled in the art will appreciate that other aspects of the invention can be obtained from a study of the drawings, the disclosure and the appended claims.

What is claimed is:

1. A method of operating an engine, comprising the steps of supplying distillate fuel characterized by a cetane number to the engine:
   compressing a mixture of fuel and air in each of a plurality of cylinders of the engine through an autoignition condition when operating in a high load mode;
   compressing a mixture of the fuel and air in a number, which is at least one but less than all, of the plurality of cylinders of the engine through an autoignition condition when operating in a low load mode;
   controlling ignition timing in the plurality of cylinders with at least one actuator; and
   setting the number of cylinders responsive to the cetane number of the fuel.

2. The method of claim 1 including a step of disabling an intake valve for each of the remaining cylinders that are not among the number of cylinders when operating in the low load; and
   the controlling step includes controlling ignition timing in each of the plurality of engine cylinders with a plurality of actuators for varying compression ratio in the plurality of cylinders.

3. The method of claim 2 including a step of determining a variance in indicated mean effective pressure for each of the plurality of cylinders; and
   the number of cylinders have an average variance that is less than an average variance of the remaining cylinders.

4. The method of claim 3 including a step of supplying fuel to the engine via direct injection into the respective cylinders; and
   the controlling step includes individually controlling a variable valve actuator associated with each cylinder of the plurality of cylinders.

5. The method of claim 4 wherein the fuel is characterized by a cetane number between 20 and 35; and
   the number of cylinders is half of the cylinders.

6. An engine comprising:
   an engine housing with a plurality of cylinders disposed therein;
   a fuel injector positioned for direct injection into each of the cylinders;
   a fuel tank of distillate fuel fluidly connected to the engine;
   an electronic controller configured to actuate all of the fuel injectors in a high load mode, and actuate at least one, but less than all, of the fuel injectors in a low load mode responsive to a cetane number of the distillate fuel, and further being configured to control ignition timing in each of the plurality of cylinders individually; and wherein a majority of fuel for each engine cycle for each actuated fuel injector is injected before autoignition conditions arise in the respective cylinder.

7. The engine of claim 6 including a variable intake valve actuator associated with each of the cylinders.

8. The engine of claim 7 including an intake valve deactivation device associated with at least one, but less than all, of the cylinders; and the electronic controller being configured to actuate each valve deactivation in a low load mode.

9. The engine of claim 8 wherein an average variance in indicated mean effective pressure for the cylinders with a valve deactivation device is greater than an average variance in indicated mean effective pressure for the remaining cylinders.

10. The engine of claim 9 wherein the distillate diesel fuel is characterized by a cetane number between 20 and 35.

* * * * *

UNITED STATES PATENT AND TRADEMARK OFFICE
CERTIFICATE OF CORRECTION

| | | |
|---|---|---|
| PATENT NO. | : 7,377,254 B2 | Page 1 of 1 |
| APPLICATION NO. | : 11/498001 | |
| DATED | : May 27, 2008 | |
| INVENTOR(S) | : Hergart et al. | |

It is certified that error appears in the above-identified patent and that said Letters Patent is hereby corrected as shown below:

Please correct the Specification as follows:
Column 3, line 57, delete "reticulated" and insert -- recirculated --.

Signed and Sealed this

Twenty-first Day of October, 2008

JON W. DUDAS
*Director of the United States Patent and Trademark Office*